United States Patent Office 3,236,832
Patented Feb. 22, 1966

3,236,832
METHOD OF PREPARING PERIODATE MODIFIED POLYGALACTOMANNAN GUMS
Joseph W. Opie, Minneapolis, and James L. Keen, New Brighton, Minn., assignors to General Mills, Inc., a corporation of Delaware
No Drawing. Filed Sept. 24, 1963, Ser. No. 316,481
10 Claims. (Cl. 260—209)

This is a continuation-in-part application of our copending application Serial No. 47,610, filed August 5, 1960, now abandoned, which was a continuation-in-part application of our application Serial No. 824,771, filed July 5, 1959, now abandoned.

This invention relates to a novel method of preparation of periodate modified polygalactomannan gums and to the products thereof. In particular this invention relates to a granular form of a periodate oxidized polygalatomannan gum in which substantially only the galactose units have been oxidized.

Guar gum is a polygalactomannan gum in which the structural chain is made up of D-mannose units with 1-4 linkages. A D-galactose unit is linked 1-6 on the average of every second D-mannose unit of the chain. The ratio of galactose to mannose is therefore 1 to 2. Locust bean gum is also a polygalactomannan gum of similar molecular structure in which the ratio of galactose to mannose is 1 to 4.

Periodic acid and periodates have frequently been used as an analytical tool with carbonhydrates to help determine the nature of the product rather than as a preparative method. For this use an excess of periodic acid or periodate is used, and all available hydroxyl systems are attacked. Galactomannan gums are quickly hydrated becoming sticky even in dilute solutions thereof. It is, therefore, difficult to conduct chemical reactions on galactomannan gums without taking the materials into very dilute solutions, i.e., 1% or less, thus creating expensive isolation problems and handling problems due to the large amount of water employed. When periodate oxidation is conducted with a very dilute aqueous solution, large amounts of water are required. With such large amounts of water, the very dilute solutions apparently prevents any crosslinking so that the oxidized product remains soluble.

It was found that a periodate oxidized gum can be prepared without the abovementioned difficulties and further can be maintained in a granular condition, if desired, by carrying out the reaction in certain aqueous solvents or with very limited amounts of water. Thus the carrying out of the periodate oxidation in an aqueous system containing sufficient organic liquid to prevent the gelation of the gum will provide a granulated gum which can then be isolated by filtration. Preferably, the organic solvent should be one that will not react with the oxidation product or in itself be attacked by the periodate.

It has been further found that using less than stoichiometric amounts of periodate the anhydrogalactose units are preferentially attacked ahead of the anhydromannose units. With guar, it is thus possible to prepare a product consisting essentially of a polyanhydromannose chain, substituted at every other number 6 position with a hydroxycarbonyl system. Such products in which only the galactose units or substantially only the galactose units have been oxidized are found to be excellent additives in the production of paper, generally being added in the beater, head box, fan pump or regulator box.

It is therefore an object of this invention to provide a novel process for preparing periodate modified polygalactomannan gums.

It is also an object of this invention to provide a process for preparation of such a periodate modified polygalactomannan gum in which substantially only the galactose units have been oxidized.

It is also an object of this invention to provide such gums in a granular condition.

Briefly, the invention comprises the oxidation of a polygalactomannan gum by a periodate in which from 0.01 to 1.0 mole of periodate is used per 1.0 mole of anhydrous hexose unit. The process of this invention is particularly suitable for the preparation of the lower level oxidized products, in which from 0.01 to 0.5 mole of periodate are employed and preferably from 0.03 to 0.15 mole. The oxidizing agents which may be employed in this invention are the periodic acids particularly paraperiodic acid, and the alkali metal salts of periodic acids, such as sodium and potassium periodate, and the like.

The ratio of galactose to mannose in the guar polymer is one to two. With guar, after oxidation with 0.25 mole periodate per anhydrous hexose unit, the ratio of galactose to mannose is found to be about one to three, thus indicating that the galactose is preferentially attacked by the periodate. Thus oxidation of the guar with periodic acid will yield a long polymeric chain of mannose units that are partially substituted with aldehyde functions on every other unit of the chain. The aldehydic function is due to the formation of carbonyl groups during the cleavage of galactose units by the periodate. Thus the gums are sometimes referred to as aldehyde gums.

Although the invention is not dependent thereon, it is believed that the molecular structure of the gum is changed by reaction with the periodic acid with a substantial number of the anhydrogalactose units of the gum essentially as follows using guar gum as an illustration.

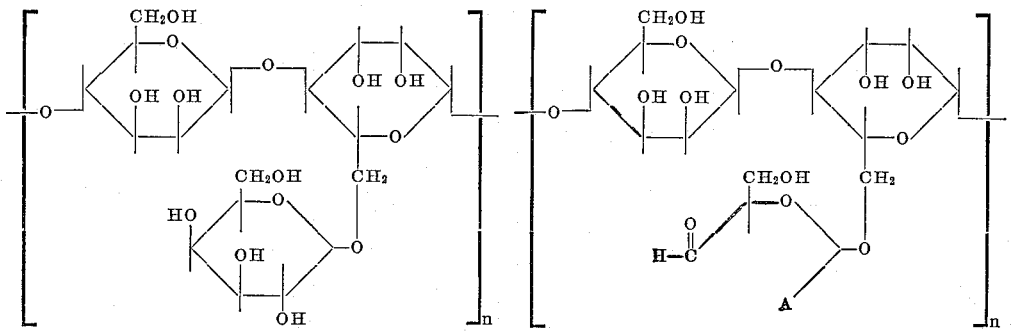

where A is substantially

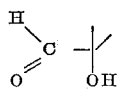

with the formation some

The action of the periodate can best be illustrated by means of the following examples.

*Example I*

0.4915 g. of purified guar gum was dissolved in 50 cc. of distilled water. 0.1623 g. of sodium periodate dissolved in 10 cc. of water was added. This represents a ratio of 0.25 mole of periodate per mole of anhydrous hexose unit. The volume was adjusted to 100 cc. and the mixture allowed to stand overnight at 4–5° C.

The product was reduced and hydrolyzed. The unoxidized hexose units were separated by paper chromatography. A colorimetric determination showed the ratio of galactose to mannose to be 1 to 3.4, thus indicating that the attack was made preferentially on the galactose unit.

*Example II*

A sample of guar was oxidized in a manner identical to Example I. After reduction and hydrolysis, the amounts of glycerol and erythritol were determined. The ratio of glycerol to erythritol was found to be 4 to 1, again indicating preferential attack on the galactose unit since glycerol would have come only from this hexose unit.

The foregoing oxidations were used merely to illustrate the selective oxidation of the gums, indicating that substantially only the galactose units are oxidized, the mannose units being substantially unoxidized. However, such a method of preparation of the gums forms no part of this invention and has various disadvantages previously mentioned. The product obtained by using the aqueous system is water soluble and can be recovered only with difficulty and with attendant large expense. Also periodates are expensive and some means must be provided for recovering their reduced products and regenerating the periodate so that it may be used again. In order to recover the reduced products, it is necessary that the gum used in the reaction remain in a granular state so that it can be filtered or otherwise recovered from the reaction mixture. The filtrate in turn will contain the iodate which can be regenerated to the periodate. In the aqueous system of oxidation, the product resulting is soluble and additional means are necessary to insolubilize the gum.

In the method of this invention, the modified gums, in a granular condition, can be prepared by dispersing the gum in a solvent mixture, at room temperature or below, consisting of 15–70% of a water miscible organic solvent that does not react with periodic acid or its salts and 85–30% water. The aqueous organic solvent prevents the gelation of the guar. The organic solvent used must be one that will not react with the oxidation product or in itself be attacked by the periodate. Any inert or unreactive, water miscible, organic solvent may be employed. While not liimted thereto, illustrative of such solvents are ketones, alcohols, ethers and ether alcohols, i.e., the alkylene (2–4 carbon atoms) ethers, the dialkyl ketones such as acetone and methyl ethyl ketone, the alkyl alcohols such as methanol, isopropyl alcohol, tertiary butyl alcohol, the alcohol alkyl ethers such as alkoxyalkanols and the like in which the alkyl group has from 1 to 4 carbon atoms. A solution of 0.01 to 1.0 mole of perodic acid of its salts, (preferably 0.05–0.25 mole) per anhydrous hexose unit of gum are added to the dispersed gum. The reaction producing aldehyde gums is usually complete with ½ hour as determined by the absence of periodate. The aldehyde gum produced in this manner is relatively insoluble in hot or cold water, but will dissolve in dilute NaHSO$_3$ solution.

The following examples will best illustrate the reactions in which the gum is recovered as a granular material.

*Example III*

Guar gum (0.4878 g.) was oxidized in 60% aqueous methanol solution using 0.25 mole of sodium periodate. The reaction was conducted at 4 to 5° C. for 24 hours. At the end of this period the periodate was completely consumed. The modified guar was in granular condition and was isolated by filtration. The product was insoluble in water and alkali indicating that a cross-linking and polymerization occurred in the presence of methanol.

*Example IV*

The same reaction was repeated in 80% methanol with the same results. Again the product was insoluble in water and alkali.

*Example V*

Guar was oxidized in the same manner as outlined above except that the reaction was carried out in a 60% acetone suspension. In this case an oxidized guar gum in a granular condition was recovered which was insoluble in water but easily soluble in alkali (pH 8). Again the product was readily recovered by filtration.

*Example VI*

100 g. commercial guar gum (dry weight) was placed in a mixture of 1700 cc. distilled water and 300 g. acetone. It was mixed ½ hour and cooled to about 10° C., 62 cc. of 1.0 molar periodic acid was added to the slurry over ½ hours. 400 g. of acetone was added to the slurry and the gum was collected by centrifuging. The product was resurred and washed four times in 1000 ml. portions of water. Each time the product was collected by centrifuging. During the washing operation, the product was brought to neutrality with ammonia. The final product was dried. A portion of the dried product was dissolved in boiling dilute NaHSO$_3$ solution and used successfully as a wet end paper additive.

Carob or locust bean gum works equally well in all the examples shown.

As with the modified guar gum, the modified locust bean gum is also useful as a wet end paper additive. The modified locust bean gum functions as a wet and dry strength additive and is normally employed as a beater additive.

In order to more fully illustrate the utility of the modified gums, handsheets were prepared from bleached kraft pulp of about 650 Schopper-Riegler Freeness. The pulp was made acid with HCl to a maximum pH near 4, prior to handsheet formation. Various wet end additives were used. The organic solvent used was tertiary butanol or acetone. The results obtained are shown in the following Table I.

TABLE I

[Pounds burst per 100 pounds ream weight]

| Product | Moles IO4- Per Hexose Unit | (Control) | Dry Burst | | | Wet Burst (approximately 15 min. soaking) | | | |
|---|---|---|---|---|---|---|---|---|---|
| | | | Percent Additive Based on Pulp Solids | | | | | | |
| | | | 1.0 | 2.5 | 5 | 0 | 1.0 | 2.5 | 5 |
| Commercial Guar Gum | | 127 | 141 | 145 | 146 | 5 | 5 | 5 | 5 |
| Do | | 129 | 150 | 152 | 158 | 5 | 5 | 5 | 5 |
| Commercial Locust Bean Gum | | 126 | 140 | 147 | 141 | 5 | 5 | 5 | 5 |
| Do | | 129 | 147 | 154 | | 5 | 5 | 5 | |
| Modified Guar Gum | 0.1 | 126 | 147 | 151 | | 5 | 25 | 31 | |
| Do | 0.2 | 126 | 138 | 142 | | 5 | 22 | 23 | |
| Do | 0.3 | 126 | 132 | 136 | | 5 | 13 | 16 | |
| Modified Locust Bean Gum | 0.1 | 123 | 163 | 167 | | 5 | 49 | 72 | |
| Do | 0.2 | 123 | 144 | 158 | | 5 | 32 | 44 | |
| Do | 0.5 | 129 | 147 | 146 | | 5 | 31 | 37 | |

Having thus described our invention, we, therefore, claim:

1. A process of preparing a periodate modified polygalactomannan gum comprising dispersing a polygalactomannan gum in a solvent mixture of from 85–30% water and from 15–70% of an unreactive, water-miscible, organic solvent and reacting said dispersed gum with an oxidizing agent selected from the group consisting of periodic acid and the alkali metal salts thereof, said oxidizing agent being employed in an amount of from 0.1 to 1.0 mole per anhydrous hexose unit.

2. A process as defined in claim 1 in which said oxidizing agent is employed in an amount of from 0.03 to 0.4 moles per anhydrous hexose unit.

3. A process as defined in claim 1 in which said organic solvent is a dialkyl ketone in which said alkyl group has from 1 to 4 carbon atoms.

4. A process as defined in claim 1 in which said organic solvent is an alkyl alcohol in which said alkyl group has from 1 to 4 carbon atoms.

5. A process as defined in claim 1 in which said gum is guar gum.

6. A process as defined in claim 1 in which said gum is locust bean gum.

7. A process of preparing a periodate modified polygalactomannan gum comprising dispersing a polygalactomannan gum in a solvent mixture consisting of from 85–30% water and from 15–70% of an unreactive, water-miscible, organic solvent selected from the group consisting of ketones, alcohols, ethers and ether alcohols and reacting said dispersed gum with an oxidizing agent selected from the group consisting of periodic acid and the alkali metal salts thereof, said oxidizing agent being employed in an amount of from 0.01 to 1.0 moles per anhydrous hexose unit.

8. A process as defined in claim 7 in which said gum is guar gum.

9. A process as defined in claim 7 in which said gum is locust bean gum.

10. A process as defined in claim 7 in which said oxidizing agent is employed in an amount of from 0.03 to 0.4 moles per anhydrous hexose unit thereby providing a periodate modified gum having substantially only the galactose units oxidized.

References Cited by the Examiner

UNITED STATES PATENTS 2,803,558   8/1957   Fronmuller _____ 260—209
2,988,455   6/1961   Rosenberg et al.        260—209

OTHER REFERENCES

Mellies et al., "Industrial and Engineering Chemistry," vol. 50, No. 9, Sept. 1958, pp. 1311–1314.

O'Meara et al., "Chemistry and Industry," January 11, 1958, pp. 4–42.

LEWIS GOTTS, *Primary Examiner.*